Figure 1:
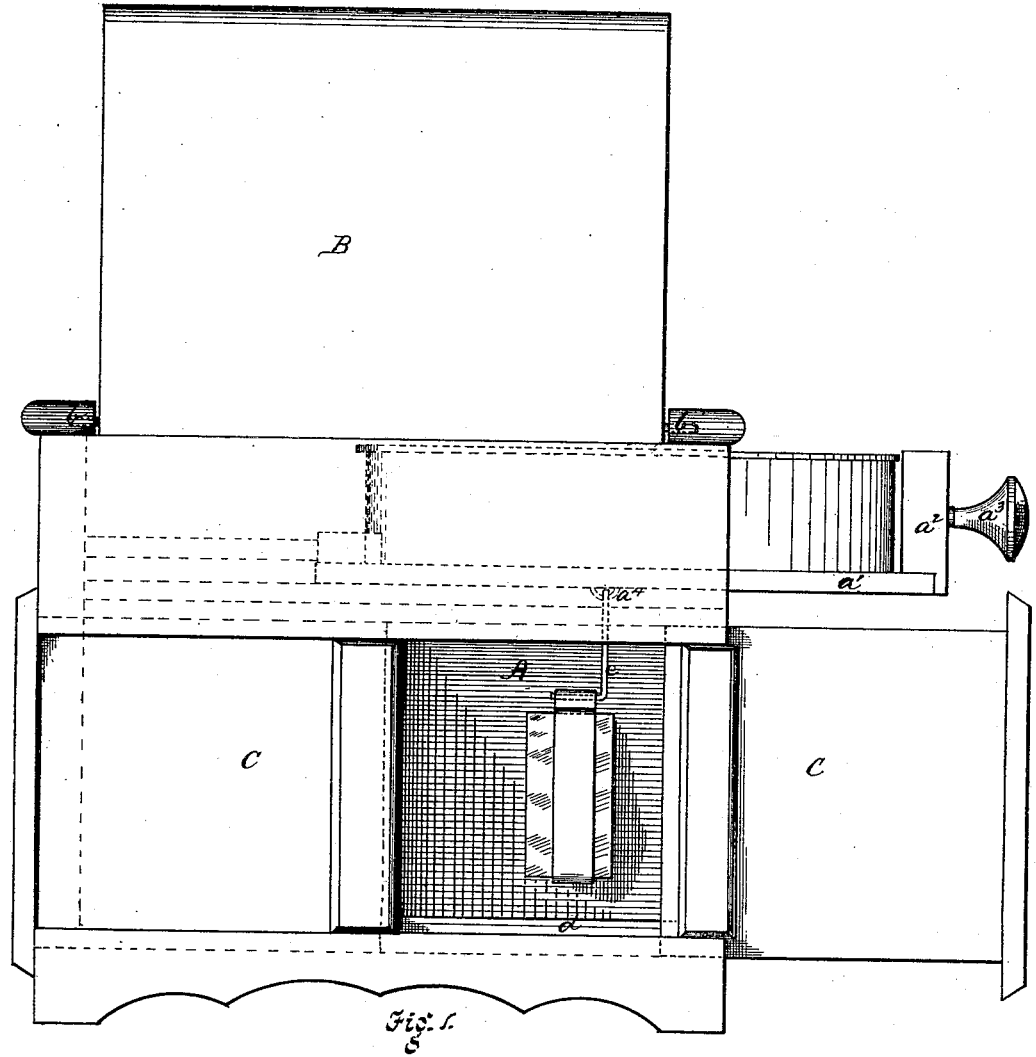

W. & REBECCA L. SKILLEN.
DOUGH-RAISING APPARATUS.

No. 181,989. Patented Sept. 5, 1876.

Witnesses:
James L. Kay
R. C. Wrenshall

Inventors:
William Skillen
Rebecca L. Skillen
by Bakewell & Kerr
Attys.

2 Sheets—Sheet 2.
W. & REBECCA L. SKILLEN.
DOUGH-RAISING APPARATUS.
No. 181,989. Patented Sept. 5, 1876.
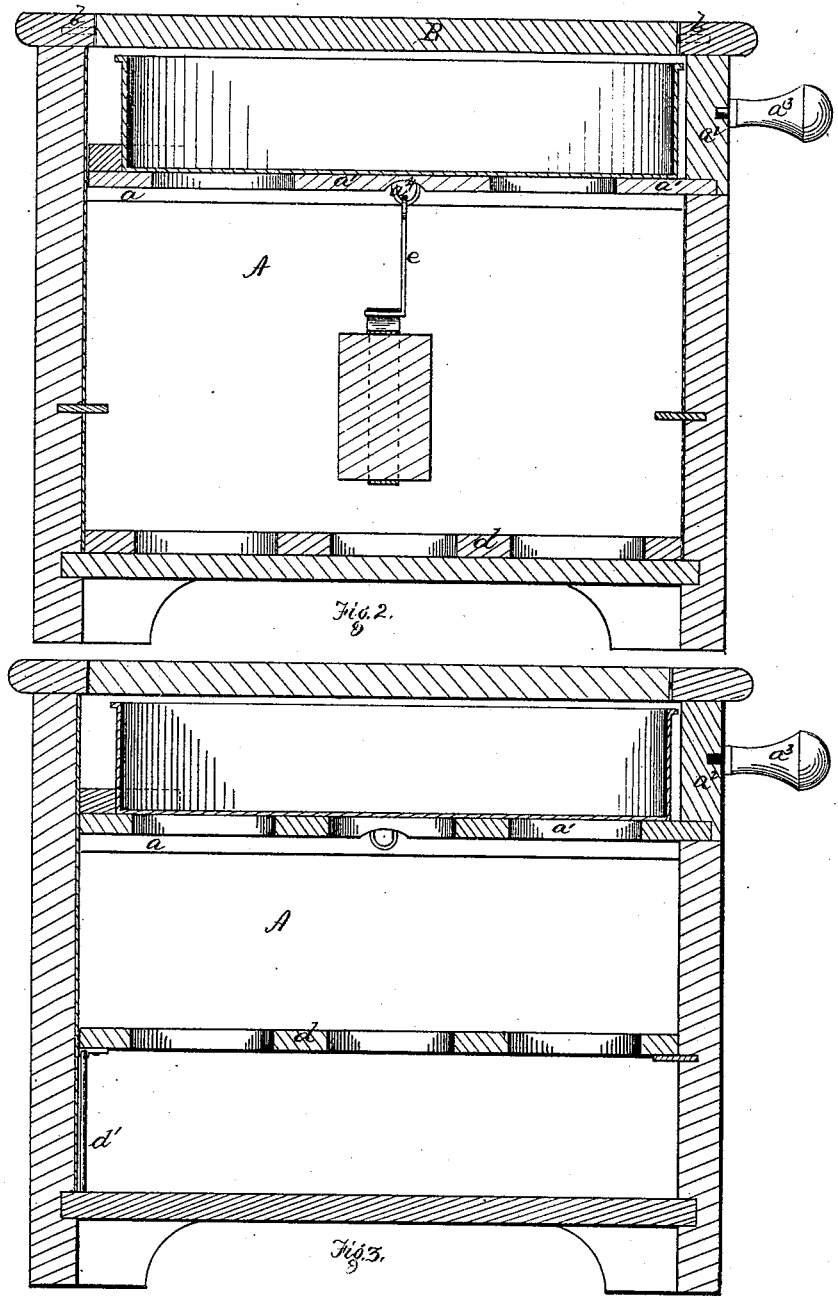
Witnesses:
James I. Kay
R. C. Wrenshall
Inventors:
William Skillen
Rebecca L. Skillen
by Bakewell & Kerr
Atty's

UNITED STATES PATENT OFFICE.

WILLIAM SKILLEN AND REBECCA L. SKILLEN, OF PARNASSUS, PA.; SAID WILLIAM SKILLEN ASSIGNOR TO R. M. STEWART AND W. M. STUART.

IMPROVEMENT IN DOUGH-RAISING APPARATUS.

Specification forming part of Letters Patent No. 181,989, dated September 5, 1876; application filed July 20, 1876.

*To all whom it may concern:*

Be it known that we, WILLIAM SKILLEN and REBECCA L. SKILLEN, of Parnassus, in the county of Westmoreland and State of Pennsylvania, have invented a new and useful Improvement in Apparatus for Raising Dough; and we do hereby declare the following to be a full, clear, and exact description thereof, reference being had to the accompanying drawing, forming part of this specification, in which—

Figure 1 is an elevation of a dough-raising apparatus embodying our invention, the drawer and lower sliding door partially withdrawn and cover raised. Fig. 2 is a longitudinal vertical section of the same. Fig. 3 is a similar section, the lower perforated partition being raised.

Like letters refer to like parts wherever they occur.

Our invention relates to apparatus intended for raising dough; and consists in a closed chamber divided by perforated partitions, which sustain the dough and permit it to be acted on by heat radiated from a previously-heated solid substance suspended within the closed chamber; and, also, in providing a drawer, by means of which the dough may be removed from the closed chamber without wasting the heat, and a hinged detachable reversible cover, which may be employed as a bread-board.

The object of the present invention is to obtain a closed chamber, for preserving the dough at a proper and uniform temperature, when from any cause the temperature of the room is allowed to decrease; and to so construct said article that it will be of general utility, as a sideboard, bread-tray, bread-cupboard, &c., whereby a neat and convenient article of kitchen furniture is obtained.

We will now proceed to describe our invention, so that others skilled in the art to which it appertains can make and use the same.

A represents a box or closet, the dimensions of which will vary according to the work expected of it. This closet or box is closed above by a cover, B, detachably hinged by an open bearing or equivalent means, as at $b\ b$, and finished upon one side, so that it can be used as a bread-board. At a suitable distance below the cover B a series of cleats, $a$, are secured to the inside of the box to support a perforated slide, $a^1$. The perforated slide $a^1$ serves to sustain within the chamber a bread-pan or like dough-containing article, and is finished with a cleat, $a^2$, and knob $a^3$, so that the slide and its contents may be withdrawn at the side of the closet, as in case of an ordinary drawer. Access is had to the lower compartment of this closet or box by means of a sliding or hinged door, C. $d$ is a second perforated shelf, provided upon its under side with hinged supports or legs $d'$, which can be folded against the shelf when it is desired to lower the shelf $d$, as shown in Fig. 2. Instead of the hinged supports, cleats may be employed, as for shelf $a^1$, if preferred. Upon the under side of shelf $a$ one or more eyes, $a^4$, or like devices, are formed for securing the hook $e$, or other means employed to suspend a brick or like solid substance within the closet beneath the dough upon the perforated shelf. The interior of the closet is generally lined with tin plate, or equivalent metal plate, which will reflect the heat and prevent the chamber from cooling off rapidly.

These devices are employed as follows: The dough being placed in a suitable receptacle upon the upper perforated shelf, the lid or cover B is closed, the sliding door C is drawn, and one or more heated bricks are suspended in the lower compartment. The radiation of heat from the bricks will keep the closet at a sufficiently high temperature to cause the dough to rise. The dough can be examined from time to time without chilling the closet, by partially withdrawing the slide or draw $a^1\ a^2$, and as soon as it is found to have raised sufficiently it may be withdrawn, the cover B removed, reversed, and used as a bread-board. After the dough is made into loaves, biscuits, &c., the cover B is replaced, the bricks removed from the lower chamber, the perforated shelf $b$ raised into position, and both shelves $a^1$ and $b$ used to place the loaves upon until such time as it is desirable to bake.

The advantages of our improved devices are that they are compact, supply all the requisites of bread-making, dispense with the necessity for keeping up fires during cold nights, and are safe and convenient.

Having thus described our invention, what we claim, and desire to secure by Letters Patent, is—

1. The combination of the closet or box A, provided with the perforated partitions $a^1$ $d$, and the heated brick or like body suspended therein, substantially as and for the purpose specified.

2. The closet or box, provided with perforated partitions, one of which forms a slide or draw, $a^1$ $a^2$, substantially as and for the purpose specified.

3. The dough-raising apparatus having the detachable reversible hinged cover B, substantially as and for the purpose specified.

In testimony whereof we, the said WILLIAM SKILLEN and REBECCA L. SKILLEN, have hereunto set our hands.

WILLIAM SKILLEN.
REBECCA LOGAN SKILLEN.

Witnesses:
JAMES HOLLIDAY,
W. J. SPROULL.